(12) United States Patent
Winkelnkemper et al.

(10) Patent No.: US 8,717,787 B2
(45) Date of Patent: May 6, 2014

(54) METHOD FOR OPERATING A CONVERTER CIRCUIT AND APPARATUS FOR IMPLEMENTING THE METHOD

(75) Inventors: Manfred Winkelnkemper, Ennetbaden (CH); Arthur Korn, Baden (CH)

(73) Assignee: ABB Schweiz AG, Baden (CH)

( * ) Notice: Subject to any disclaimer, the term of this patent is extended or adjusted under 35 U.S.C. 154(b) by 13 days.

(21) Appl. No.: 13/447,059

(22) Filed: Apr. 13, 2012

(65) Prior Publication Data

US 2012/0201057 A1    Aug. 9, 2012

Related U.S. Application Data

(63) Continuation of application No. PCT/EP2010/065033, filed on Oct. 7, 2010.

(30) Foreign Application Priority Data

Oct. 15, 2009   (DE) .................................. 091 73 094

(51) Int. Cl.
    *H02H 7/122* (2006.01)
    *B23K 9/073* (2006.01)
    *H02M 1/00* (2007.01)

(52) U.S. Cl.
    USPC ........................ 363/43; 363/56.01; 219/130.4

(58) Field of Classification Search
    USPC .................... 363/43, 44, 148, 56.01; 323/207; 219/130.4
    See application file for complete search history.

(56) References Cited

U.S. PATENT DOCUMENTS 7,385,159 B2 *   6/2008   Stava .......................... 219/130.4
(Continued)

FOREIGN PATENT DOCUMENTS

DE    10 2008 014898 A1    9/2009
(Continued)

OTHER PUBLICATIONS

Notification of Transmittal of Translation of the International Preliminary Report on Patentability (Forms PCT/IB/338 and PCT/IB/373) and the Written Opinion of the International Searching Authority (Form PCT/ISA/237) issued on May 18, 2012, in corresponding International Application No. PCT/EP2010/065033. (16 pages).

(Continued)

*Primary Examiner* — Adolf Berhane
*Assistant Examiner* — Trinh Dang
(74) *Attorney, Agent, or Firm* — Buchanan Ingersoll & Rooney PC

(57) ABSTRACT

A method and apparatus are provided for operating a converter circuit, which includes at least two phase modules each having first and second subconverter systems, which include power semiconductor switches. The switches of the first and second subconverter systems are driven by first and second drive signals, respectively. To enable dimensioning a capacitive energy store of the converter circuit to be independent of a desired current at an output connection of the converter circuit, for each phase module, the first and second drive signals are respectively formed from a voltage signal across inductances and a switching function for the switches of the first and second subconverter systems, respectively. The switching functions are formed by a voltage signal corresponding to the voltage at the output connection and a selectable reference signal. The voltage signals are selected to be in phase with the voltage at the output connections of the phase modules.

20 Claims, 4 Drawing Sheets

(56) References Cited

U.S. PATENT DOCUMENTS

2003/0026111 A1    2/2003   Steimer et al.
2008/0232145 A1*   9/2008   Hiller et al. ................ 363/56.01
2008/0310205 A1   12/2008   Hiller
2010/0253304 A1   10/2010   Winkelnkemper
2011/0018481 A1    1/2011   Hiller

FOREIGN PATENT DOCUMENTS

| EP | 1 253 706 A1 | 10/2002 |
| EP | 2 254 233 A1 | 11/2010 |
| WO | WO 2007/023064 A1 | 3/2007 |
| WO | WO 2007/033852 A2 | 3/2007 |

OTHER PUBLICATIONS

International Search Report (PCT/ISA/210) issued on Sep. 7, 2011, by European Patent Office as the International Searching Authority for International Application No. PCT/EP2010/065033.

Written Opinion (PCT/ISA/237) issued on Sep. 7, 2011, by European Patent Office as the International Searching Authority for International Application No. PCT/EP2010/065033.

European Search Report for 09179034 dated Apr. 19, 2010.

A. Antonopoulos et al., "On Dynamics and Voltage Control of the Modular Multilevel Converter", Power Electronics and Applications, Sep. 8, 2009, pp. 1-10.

A. Korn et al., "Low Output Frequency Operation of the Modular Multi-Level Converter", Energy Conversion Congress and Exposition, Sep. 12, 2010, pp. 3993-3997.

* cited by examiner

METHOD FOR OPERATING A CONVERTER CIRCUIT AND APPARATUS FOR IMPLEMENTING THE METHOD

RELATED APPLICATIONS

This application claims priority as a continuation application under 35 U.S.C. §120 to PCT/EP2010/065033, which was filed as an International Application on Oct. 7, 2010 designating the U.S., and which claims priority to European Application 09173094.5 filed in Europe on Oct. 15, 2009. The entire contents of these applications are hereby incorporated by reference in their entireties.

FIELD

The present disclosure relates to the field of power electronics. More particularly, the present disclosure relates to a method for operating a converter circuit and to an apparatus for operating a converter circuit.

BACKGROUND INFORMATION

Converter circuits are used in a multiplicity of applications. A converter circuit with a voltage which can be scaled particularly easily is specified in WO 2007/023064 A1. In WO 2007/023064 A1, the converter circuit has first second subconverter systems which are connected in series with one another via two inductances, which are likewise connected in series. A node between the two inductances connected in series forms an output connection, for example, for an electrical load. Each subconverter system includes at least one two-pole switching cell, wherein these switching cells are connected in series with one another in the event of a plurality of switching cells in a subconverter system. Each two-pole switching cell has two drivable bidirectional power semiconductor switches which are connected in series with a controlled unidirectional current guidance direction and a capacitive energy store, which is connected in parallel with the series circuit including the power semiconductor switches.

For the operation of a converter circuit in accordance with WO 2007/023064 A1, a known apparatus, as is shown in FIG. 1, is provided which has a first drive circuit for producing a first drive signal for driving the power semiconductor switches of the switching cells of the first subconverter system and a second drive circuit for producing a second drive signal for driving the power semiconductor switches of the switching cells of the second subconverter system.

The converter circuit in accordance with WO 2007/023064 A1 is operated in such a way that a pure AC voltage and a pure alternating current are provided at the output connection. The design of the capacitive energy store of the switching cells is such that the voltage ripple at the capacitive energy stores remains within a predetermined fluctuation range for a given maximum current at the output connection and a given frequency of this current. If a low frequency is desired in comparison with that used as the basis for dimensioning, the voltage ripple increases. If a direct current or an alternating current with a DC component is intended to be provided at the output connection, the voltage ripple increases virtually to infinity. The capacitive energy stores in this case need to either be fed externally or to be infinitely large so that they are not completely discharged or overcharged in any way during operation with direct current or DC component at the output connection.

A method for operating a converter circuit in accordance with WO 2007/023064 A1 which provides the possibility of dimensioning of the capacitive energy stores which is independent of the desired current at the output connection, i.e. the frequency thereof, is not known at present.

In addition, DE 10 2008 014 898 A1 and WO 2007/033852 A2 each also specify a method of the generic type for operating a converter circuit. In addition, "On Dynamics and Voltage Control of the Modular Multilevel Converter", Power Electronics and Applications, 2009, EPE 2009, 13th European Conference on IEEE, 09.18.2009 likewise specifies a method for operating an abovementioned converter circuit. Furthermore, EP 1 253 706 A discloses a converter circuit and a method for transmitting real power.

SUMMARY

An exemplary embodiment of the present disclosure provides a method for operating a converter circuit. The converter circuit includes at least two phase modules, where each phase module has a first subconverter system and a second subconverter system. The subconverter systems are connected in series with one another for each phase module. A node between the two subconverter systems forms an output connection, and each subconverter system includes an inductance and at least one two-pole switching cell, which is connected in series with the inductance. Each switching cell has two drivable bidirectional power semiconductor switches, which are connected in series with a controlled unidirectional current guidance direction and a capacitive energy store, which is connected in parallel with the power semiconductor switches connected in series. The power semiconductor switches of the switching cells of the first subconverter system are driven by means of a first drive signal, and the power semiconductor switches of the switching cells of the second subconverter system are driven by means of a second drive signal. The exemplary method includes, for each phase module, forming the first drive signal from a voltage signal across the inductances and a first switching function for the power semiconductor switches of the switching cells of the first subconverter system, and forming the second drive signal from the voltage signal across the inductances and a second switching function for the power semiconductor switches of the switching cells of the second subconverter system. The exemplary method also includes forming the switching functions by means of a voltage signal with respect to the voltage at an output connection of the corresponding phase module and a selectable reference signal, the voltage signals being selected so as to be in phase with the voltage at the output connections of the phase modules. In addition, the exemplary method includes forming, for each phase module, the voltage signal across the inductances from a current signal of the subconverter systems, forming, for each phase module, the current signal of the subconverter systems from a current signal amplitude value, and forming, for each phase module, the current signal amplitude value from an actual current value at the output connection and the reference signal.

An exemplary embodiment of the present disclosure provides an apparatus for operating a converter circuit. The converter circuit includes at least two phase modules. Each phase module includes a first subconverter system and a second subconverter system. The subconverter systems are connected in series with one another for each phase module. A node between the two subconverter systems forms an output connection. Each subconverter system includes an inductance and at least one two-pole switching cell, which is connected in series with the inductance. Each switching cell has two drivable bidirectional power semiconductor switches, which are connected in series, with a controlled unidirectional current guidance direction and a capacitive energy store, which is connected in parallel with the power semiconductor switches connected in series. The exemplary apparatus includes a first drive circuit connected to the power semiconductor switches of the switching cells of the first subconverter system. The first drive circuit is configured to, for each phase module, produce a first drive signal by being supplied with, with respect to each phase module, a sum of a voltage signal across the inductances and a switching function for the power semiconductor switches of the switching cells of the first subconverter system. The exemplary apparatus also includes a second drive circuit connected to the power semiconductor switches of the second subconverter system. The second drive circuit is configured to, for each phase module, produce a second drive signal by being supplied with, with respect to each phase module, the sum of the voltage signal across the inductances and a switching function for the power semiconductor switches of the switching cells of the second subconverter system. In addition, the exemplary apparatus includes a first computation unit configured to, with respect to each phase module, form the switching functions from a voltage signal with respect to the voltage at the output connection and a selectable reference signal, the voltage signals with respect to the voltage at the output connections of the corresponding phase modules being selected to be in phase. The exemplary apparatus also includes a second computation unit configured to, with respect to each phase module, form the voltage signal across the inductances from a current signal of the subconverter systems. Furthermore, the exemplary apparatus includes a third computation unit configured to, with respect to each phase module, form the current signal of the subconverter systems from a current signal amplitude value. The exemplary apparatus also includes a fourth computation unit configured to, with respect to each phase module, form the current signal amplitude value from an actual current value at the output connection and the reference signal.

BRIEF DESCRIPTION OF THE DRAWINGS

Additional refinements, advantages and features of the present disclosure are described in more detail below with reference to exemplary embodiments illustrated in the drawings, in which.

DETAILED DESCRIPTION

Figure 1:
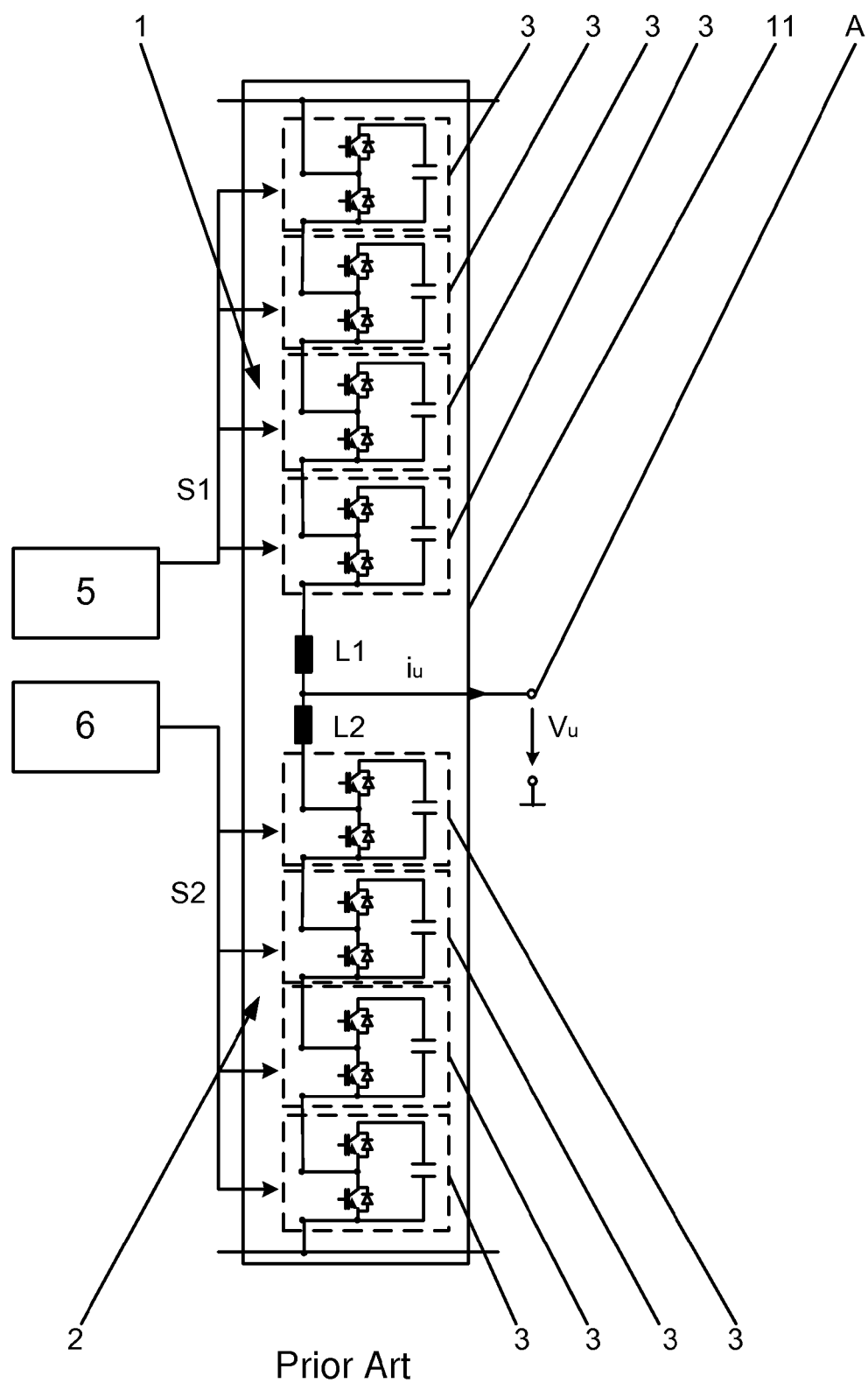
FIG. 1 shows a known apparatus for implementing a method for operating a converter circuit.

Exemplary embodiments of the disclosure provide a method for operating a converter circuit, which provides the possibility of dimensioning of the capacitive energy stores of the converter circuit which is independent of the desired current at the output connection of the converter circuit, for example, the frequency thereof. In addition, exemplary embodiments of the disclosure provide an apparatus with which the method according to the disclosure can be implemented in a particularly simple manner.

The converter circuit includes a first subconverter system and a second subconverter system, which are connected in series with one another. A node between the two subconverter systems forms an output connection. Each subconverter system includes an inductance and at least one two-pole switching cell, which is connected in series with the inductance, and each switching cell has two drivable bidirectional power semiconductor switches which are connected in series with a controlled unidirectional current guidance direction and a capacitive energy store, which is connected in parallel with the series circuit including the power semiconductor switches. In accordance with an exemplary embodiment, the number of switching cells of the first subconverter system corresponds to the number of switching cells of the second subconverter system. In accordance with an exemplary embodiment of the method, the power semiconductor switches of the switching cells of the first subconverter system are driven by means of a first drive signal, and the power semiconductor switches of the switching cells of the second subconverter system are driven by means of a second drive signal. In accordance with an exemplary embodiment of the present disclosure, the first drive signal is formed from a voltage signal across the inductances and a first switching function for the power semiconductor switches of the switching cells of the first subconverter system, and the second drive signal is formed from the voltage signal across the inductances and a second switching function for the power semiconductor switches of the switching cells of the second subconverter system. The switching functions are formed, for example, simultaneously, by means of a voltage signal with respect to the voltage at the output connection and a selectable reference signal. For each phase module, the voltage signal across the inductances is then formed from a current signal of the subconverter systems. In addition, for each phase module, the current signal of the subconverter systems is in turn formed from a current signal amplitude value and, for each phase module, the current signal amplitude value is formed from the actual current value at the output connection and the reference signal. By means of the voltage signal across the inductances for the production of the first drive signal and the second drive signal and by virtue of the voltage signal with respect to the voltage at the output connection for producing the switching functions, it is advantageously possible to achieve a situation in which the voltage ripple at the capacitive energy stores can be reduced significantly given a desired current at the output connection of the converter circuit. As a result, the design or dimensioning of the capacitive energy stores need only be performed with respect to the now reduced voltage ripple and is therefore independent of the desired output current. In general, the voltage signal across the inductances and the voltage signal with respect to the voltage at the output connection can have any desired time profile. In accordance with an exemplary embodiment, the voltage signal across the inductances and the voltage signal with respect to the voltage at the output connection are subject to sinusoidal oscillation, for example, however.

In accordance with an exemplary embodiment, the apparatus according to the present disclosure for operating the converter circuit includes, for each phase module, a first drive circuit configured to produce the first drive signal. The first drive circuit is connected to the power semiconductor switches of the switching cells of the first subconverter system. In addition, the apparatus includes, for each phase module, a second drive circuit configured to produce the second drive signal. The second drive circuit is connected to the power semiconductor switches of the switching cells of the second subconverter system. In accordance with an exemplary embodiment of the present disclosure, with respect to each phase module, the sum of the voltage signal across the inductances and the first switching function for the power semiconductor switches of the switching cells of the first subconverter system are supplied to the first drive circuit for forming the first drive signal. With respect to each phase module, the sum of the voltage signal across the inductances and a second switching function for the power semiconductor switches of the switching cells of the second subconverter system is supplied to the second drive circuit for forming the second drive signal. With respect to each phase module, the exemplary apparatus also includes a first computation unit for calculating the switching functions from a voltage signal with respect to the voltage at the output connection and a selectable reference signal. The voltage signals with respect to the voltage at the output connections of the phase modules may be selected so as to be in phase. In addition, with respect to each phase module, the exemplary apparatus includes a second computation unit for forming the voltage signal across the inductances from the current signal of the subconverter systems. In addition, with respect to each phase module, the exemplary apparatus includes a third computation unit for forming the current signal of the subconverter systems from the current signal amplitude value, and a fourth computation unit for forming the current signal amplitude value from the actual current value at the output connection and the reference signal. The exemplary apparatus according to the present disclosure for implementing the method for operating the converter circuit can therefore be implemented in a very simple and inexpensive manner since the complexity in terms of circuitry can be kept extremely low and, in addition, only a small number of components is required for the construction. By means of this apparatus, the method according to the present disclosure can thus be implemented in a particularly simple manner.

The reference symbols used in the drawings and the significance thereof are listed in the list of reference symbols by way of summary. In principle, identical parts have been provided with the same reference symbols in the drawings. The described embodiments represent, by way of example, the subject matter of the disclosure and have no restrictive effect.

Figure 2:
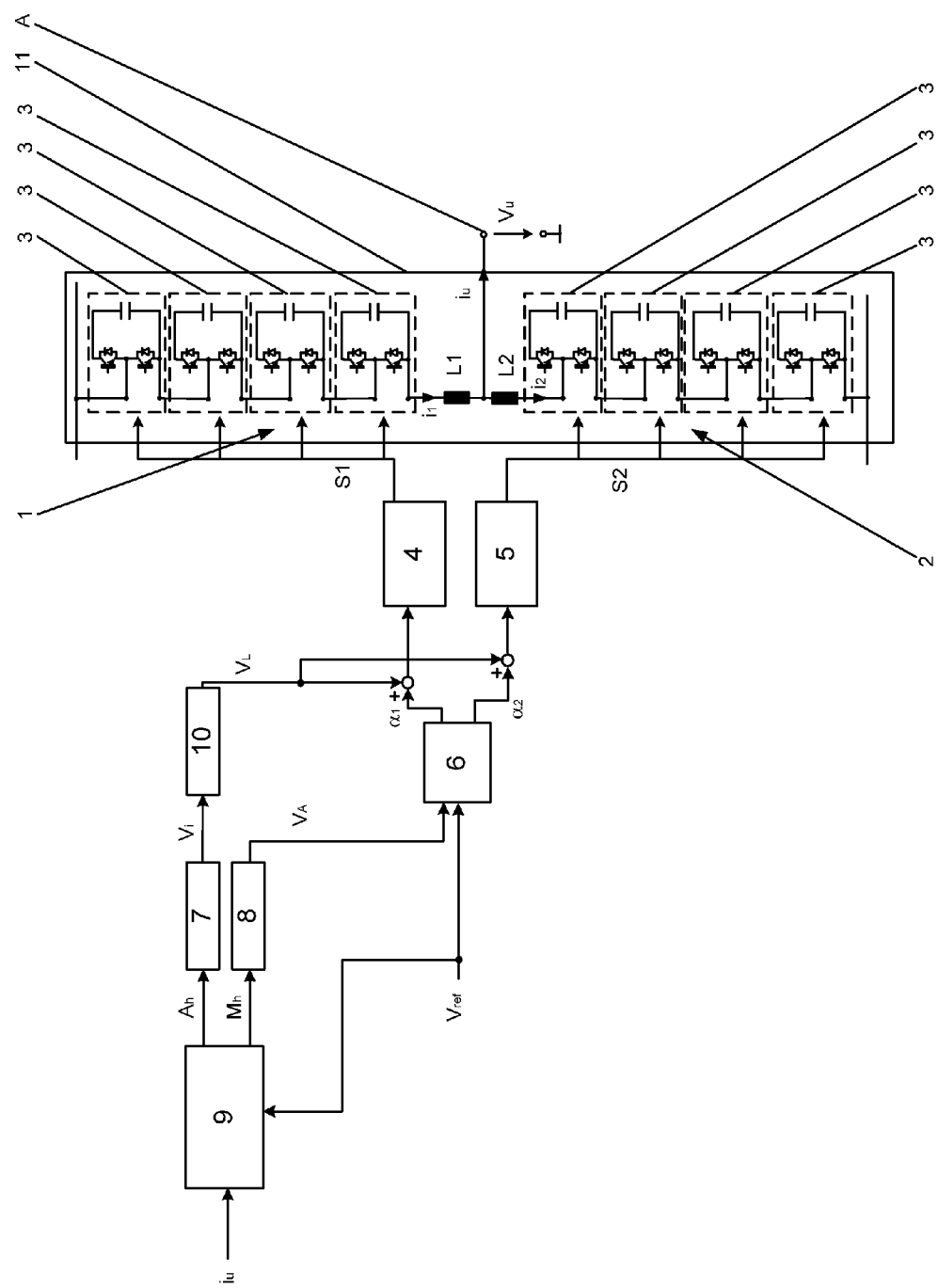
FIG. 2 shows an embodiment of an apparatus according to an exemplary embodiment of the present disclosure for implementing a method according to the present disclosure for operating a converter circuit.

FIG. 1 illustrates, as already mentioned at the outset, a known apparatus for implementing a method for operating a converter circuit. FIG. 1 illustrates only one phase module 11 of the converter circuit, for reasons of clarity. FIG. 2 shows an embodiment of an exemplary apparatus according to the present disclosure for implementing the method according to the present disclosure for operating a converter circuit, wherein only one phase module 11 of the converter circuit is shown in FIG. 2 as well, for reasons of clarity. The converter circuit shown in FIG. 2 generally has at least two phase modules 11, with each phase module including a first subconverter system 1 and a second subconverter system 2. The two subconverter systems 1, 2 are connected in series with one another. A node between the subconverter systems 1, 2 forms an output connection A. Each subconverter system 1, 2 generally includes an inductance L1, L2 and at least one two-pole switching cell 3 connected in series therewith. In the case of a plurality of switching cells 3 of a subconverter system 1, 2, these switching cells 3 are connected in series with one another, as shown in FIG. 2. Each switching cell 3 has two drivable bidirectional power semiconductor switches which are connected in series with a controlled unidirectional current guidance direction and a capacitive energy store, which is connected in parallel with the series circuit including the power semiconductor switches. The drivable power semiconductor switch can, for example, be in the form of a gate turn-off thyristor (GTO) or an integrated gate commutated thyristor (IGCT) with in each case one diode connected back-to-back in parallel. However, it is also conceivable for a drivable power semiconductor switch to be in the form of, for example, a power MOSFET with additionally a diode connected back-to-back in parallel, or in the form of an insulated gate bipolar transistor (IGBT) with additionally a diode connected back-to-back in parallel. In accordance with an exemplary embodiment, the number of switching cells 3 in the first subconverter system 1 corresponds to the number of switching cells 3 in the second subconverter system 2.

In accordance with the an exemplary embodiment of the method, the power semiconductor switches of the switching cells 3 in the first subconverter system 1 are driven by means of a first drive signal S1, and the power semiconductor switches of the switching cells 3 in the second subconverter system 2 are driven by means of a second drive signal S2. The first drive signal S1 of the switching cells 3 of the first subconverter system 1 and the second drive signal S2 of the switching cells 3 of the second subconverter system 2 are, in accordance with an exemplary embodiment, subject to a temporal shift for each switching cell 3, with the result that each switching cell 3 can advantageously be driven with a temporal shift. According to an exemplary embodiment of the present disclosure, for each phase module 11, the first drive signal S1 is formed from a voltage signal $V_L$ across the inductances L1, L2 and a switching function $\alpha_1$ for the power semiconductor switches of the switching cells 3 of the first subconverter system 1, for example, from the sum of the two variables, and the second drive signal S2 is formed from the voltage signal $V_L$ across the inductances L1, L2 and a switching function $\alpha_2$ for the power semiconductor switches of the switching cells 3 of the second subconverter system 2, for example, from the sum of the two variables. The switching functions $\alpha_1$, $\alpha_2$ are formed by means of a voltage signal $V_A$ with respect to the voltage $V_u$ at the output connection A of the associated phase module 11 and a selectable reference signal $V_{ref}$, for example, simultaneously. The voltage signals $V_A$ with respect to the voltage $V_u$ at the output connections A of the phase modules 11 are selected in phase with one another. The voltage signal $V_L$ across the inductances L1, L2 is a setpoint voltage value across the inductances L1, L2. In accordance with an exemplary embodiment, a reference voltage signal with respect to the voltage $V_u$ at the output connection A is selected as reference signal $V_{ref}$, where the reference voltage signal may be formed by adjusting the actual value of the current $i_u$ at the output connection A to a setpoint value, for example.

By means of the voltage signal $V_L$ across the inductances L1, L2 for producing the first drive signal S1 and the second drive signal S2 and owing to the voltage signal $V_A$ with respect to the voltage $V_u$ at the output connection A for producing the switching functions $\alpha_1$, $\alpha_2$, it is advantageously possible to achieve a situation in which the voltage ripple at the capacitive energy stores can be significantly reduced given a desired current $i_u$ at the output connection A of the converter circuit, as a result of which the design or dimensioning of the capacitive energy store merely needs to take place with respect to the now reduced voltage ripple and is therefore independent of the desired output current $i_u$.

In general, the voltage signal $V_L$ across the inductances L1, L2 and the voltage signal $V_A$ with respect to the voltage $V_u$ at the output connection A can have any desired time profile. The voltage signal $V_L$ across the inductances L1, L2 and the voltage signal $V_A$ with respect to the voltage $V_u$ at the output connection A can therefore be a sinusoidal oscillation, for example.

One aim is, for example, for the undesired proportion in the capacitive energy stores of the switching cells 3 from the power which is formed from the voltage signal $V_A$ with respect to the voltage $V_u$ at the output connection and from a current signal $V_i$ of the subconverter systems 1, 2 to be compensated for. The current signal $V_i$ of the subconverter systems 1, 2 is a setpoint current value of a circuit current which is flowing through the subconverter systems 1, 2 of the converter circuit, but not via the output connection A.

In general, the following applies:
When a current $i_U$ is flowing at the phase output A and a voltage $V_U$ is present at the phase output A, the power in the capacitive energy stores of the above switching cells 3 is $P_{C,1}=(i_U(t)/2+i_X(t))\cdot V_{U1}(t)$, where $i_U/2$=half the load current, $i_X$=impressed circuit current (for reasons of simplicity this can be zero, but does not necessarily need to be), $V_{U1}$=branch voltage across the upper switching cells 3. When $i_X$=0, this results in a power of $P_{C,1}=i_U(t)/2\cdot V_{U1}(t)$ The current signal $V_i(t)$ of the subconverter systems 1, 2 and the voltage signal $V_A(t)$ is now impressed in a targeted manner at phase output A. The voltage signal also occurs in the branch voltage $V_{U1}$ across the upper switching cells 3, with the result that the power is now $$P_{C,1}=(i_U(t)/2+V_i(t))(V_{U1}(t)+V_A(t))=i_U(t)/2\cdot V_{U1}(t)+i_U(t)/2\cdot V_A(t)+V_i(t)V_{U1}(t)+V_i(t)\cdot V_A(t).$$

$i_U(t)/2\cdot V_{U1}(t)$ is intended to be compensated, to be precise by a proportion of the power $V_i(t)\cdot V_A(t)$. The additional powers occurring $i_U(t)/2\cdot V_A(t)+V_i(t)\cdot V_{U1}(t)$ are in general not compensated for.

This method makes sense when the powers $i_U(t)/2\cdot V_A(t)+V_i(t)\cdot V_{U1}(t)$ and the uncompensated proportion of the power $V_i(t)*V_A(t)$ each contain frequency proportions with an amplitude-to-frequency ratio which is smaller than that of the frequency proportions in $i_U(t)\cdot V_{U1}(t)$ and therefore bring about a smaller voltage fluctuation in the capacitive energy store. All of $V_i(t)$ and $V_A(t)$, which give the same result, can be used for the described method.

In accordance with an exemplary embodiment of the present disclosure, the switching function $\alpha_1$ for the power semiconductor switches of the switching cells 3 of the first subconverter system 1 is formed from the voltage signal $V_A$ with respect to the voltage $V_u$ at the output connection A and the selectable reference signal $V_{ref}$ in accordance with the following formula:

$$\alpha_1 = \frac{1}{2}(1 - V_{ref} - V_A) \quad [1]$$

Furthermore, the switching function $\alpha_2$ for the power semiconductor switches of the switching cells 3 of the second subconverter system 2 is formed from the voltage signal $V_A$ with respect to the voltage $V_u$ at the output connection A and the selectable reference signal $V_{ref}$ in accordance with the following formula:

$$\alpha_2 = \frac{1}{2}(1 + V_{ref} + V_A) \quad [2]$$

A particularly simple method results when the voltage signal $V_A$ with respect to the voltage $V_u$ at the output connection and a current signal $V_i$ as oscillation signal, for example, as sinusoidal oscillation, are selected. More detail will be given below in this regard.

In accordance with an exemplary embodiment of the present disclosure, for each phase module 11, the voltage signal $V_L$ across the inductances L1, L2 is formed from a current signal $V_i$ of the subconverter systems 1, 2, as illustrated by the following formula:

$$V_L = V_i \cdot (j\omega(L1+L2)) \quad [3]$$

In accordance with an exemplary embodiment, the current signal $V_i$ of the subconverter systems 1, 2 is formed for each phase module 11 in turn from a current signal amplitude value $A_h$, for example, by multiplying the current signal amplitude value $A_h$ by an oscillation with a freely selectable frequency $\omega$ and phase shift $\phi$, as illustrated by the following formula:

$$V_i = A_h \cdot \cos(\omega t + \phi) \quad [4]$$

The current signal amplitude value $A_h$ in formula [4] is generally formed for each phase module 11 from the actual current value $i_u$ at the output connection A, for example, from the DC component $I_0$ of the current $i_u$ at the output connection A, which actual current value $i_u$ is measured, for example, and the reference signal $V_{ref}$. The current $i_1$ through the first subconverter system 1 and the current $i_2$ through the second subconverter system 2 are as follows:

$$i_1(t) = \frac{I_0}{2} \cdot [1 + V_{ref} + M_h \cdot \cos(\omega t + \varphi)] + A_h \cdot \cos(\omega t + \varphi) \quad [4.1]$$

$$i_2(t) = \frac{I_0}{2} \cdot [-1 + V_{ref} + M_h \cdot \cos(\omega t + \varphi)] + A_h \cdot \cos(\omega t + \varphi) \quad [4.2]$$

The currents $i_{c,1}$ in the capacitive energy stores of the switching cells 3 of the first subconverter system 1 the currents $i_{c,2}$ in capacitive energy stores of the switching cells 3 of the second subconverter system 2 then result as follows:

$$i_{c,1}(t) = \frac{I_0}{4}(1 + V_{ref})(1 - V_{ref}) + \quad [4.3]$$
$$\left(\frac{I_0 \cdot M_h}{4}(1 - V_{ref}) + \frac{A_h}{2}(1 - V_{ref}) - \frac{I_0 \cdot M_h}{4}(1 + V_{ref})\right)$$
$$\cos(\omega t + \varphi) - \frac{I_0 \cdot M_h^2}{8}(1 + \cos(2\cdot(\omega t + \varphi))) -$$
$$\frac{A_h \cdot M_h}{4}(\cos(\Delta\varphi)(1 + \cos(2\cdot(\omega t + \varphi)))$$

$$i_{c,2}(t) = -\frac{I_0}{4}(1 + V_{ref})(1 - V_{ref}) + \quad [4.4]$$
$$\left(-\frac{I_0 \cdot M_h}{4}(1 - V_{ref}) + \frac{A_h}{2}(1 - V_{ref}) - \frac{I_0 \cdot M_h}{4}(1 + V_{ref})\right)$$
$$\cos(\omega t + \varphi) + \frac{I_0 \cdot M_h^2}{8}(1 + \cos(2\cdot(\omega t + \varphi))) +$$
$$\frac{A_h \cdot M_h}{4}(\cos(\Delta\varphi)(1 + \cos(2\cdot(\omega t + \varphi)))$$

Equations [4.3] and [4.4] each contain DC components, which are advantageously intended to cancel one another out, with the result that the following relationship in accordance with formula [5.1]:

$$\frac{1}{2}I_0 \cdot M_h^2 + A_h \cdot M_h \cdot \cos(\Delta\varphi) - (1 + V_{ref}) \cdot (1 - V_{ref}) \cdot I_0 \equiv 0 \quad [5.1]$$

and, for example, in accordance with formula [5.2]

$$A_h = M_h \quad [5.2]$$

is set from the equation [4.3] and [4.4], respectively, for forming the current signal amplitude value $A_h$, where $\Delta\phi$ is generally the phase difference between the impressed oscillations and the voltage $V_u$ at the output connection A. Reference is made to the fact that the ratio of $A_h$ to $M_h$ in formula [5.2] is selected merely by way of example, e.g., the ratio of $A_h$ to $M_h$ can generally be freely selected. In order to determine the current signal amplitude value $A_h$, formula [5.1] therefore merely needs to be solved in accordance with the current signal amplitude value $A_h$ as well.

In addition, for each phase module 11, the voltage signal $V_A$ with respect to the voltage $V_u$ at the output connection A is generally formed from a voltage signal amplitude value $M_h$, for example, by multiplying the voltage signal amplitude value $M_h$ by an oscillation of a freely selectable frequency $\omega$ and phase shift $\phi$, as indicated by the following formula:

$$V_A = M_h \cdot \cos(\omega t + \phi) \quad [6]$$

In general, for each phase module 11, the voltage signal amplitude value $M_h$ is formed from the actual current value $i_u$ from the output connection A and the reference signal $V_{ref}$ with it advantageously being possible to refer back to formulae [5.1] and [5.2], and with it now only being necessary to resolve formula [5.1] in accordance with the voltage signal amplitude value $M_h$ in order to determine the voltage signal amplitude value $M_h$.

In accordance with an exemplary embodiment, for each phase module 11, the current signal $V_i$ of the subconverter systems 1, 2, the voltage signal $V_L$ across the inductances L1, L2 and the voltage signal $V_A$ with respect to the voltage $V_u$ at the output connection A may have the same frequency $\omega$. Furthermore, for each phase module 11, the voltage signal $V_L$ across the inductances L1, L2 and the voltage signal $V_A$ with respect to the voltage $V_u$ at the output connection A advantageously have the same phase shift $\phi$, with the same phase shift $\phi$ not being absolutely essential.

As has already been mentioned at the outset, the converter circuit generally has at least two phase modules 11, with the result that a polyphase converter circuit is implemented. By virtue of selecting the voltage signals $V_A$ with respect to the voltage $V_u$ at the output connections A of the phase modules 11 to be in phase with one another, in accordance with an exemplary embodiment of the method according to the present disclosure, it is advantageously possible to produce a total output current $i_{ug}$, for example through a polyphase electrical load connected to the output connections A, with a pure DC component, wherein only the impressed oscillations influence the voltage ripple at the capacitive energy stores of the switching cells 3 and the voltage ripple can therefore be kept low. The impressed oscillations then appear as common-mode voltage at the polyphase electrical load. This common-mode voltage does not produce any additional current oscillations, with the result that the DC component can advantageously be achieved. Advantageously, the design or dimensioning of the capacitive energy stores can only be performed with respect to the now low voltage ripple, for example, irrespective of the desired output current $i_u$. This method is used in overmodulation, for example. In contrast to overmodulation, in this case the frequency and phase angle of the common-mode voltage is as desired. The then polyphase total output current $i_{ug}$ is such a pure direct current, that is, it does not have any AC components.

Figure 3:
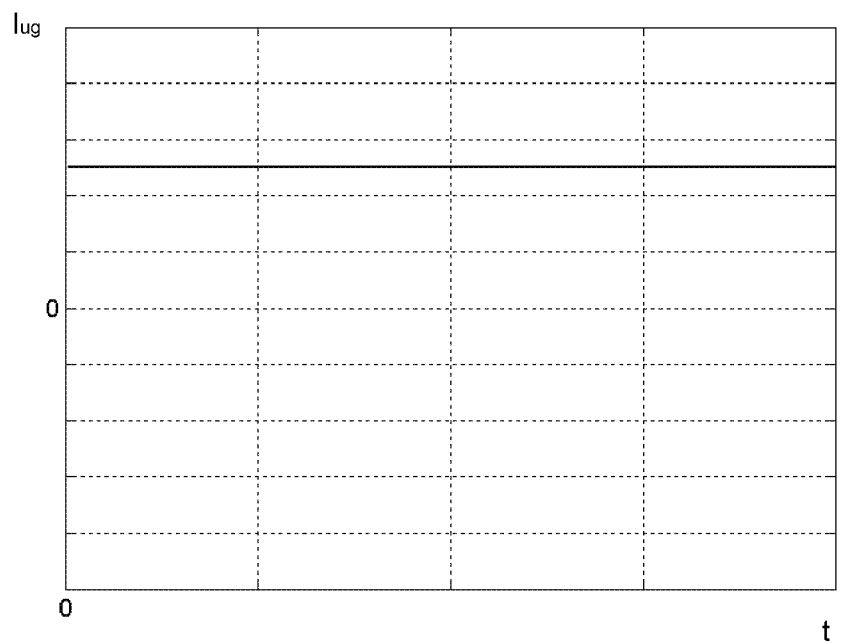
FIG. 3 shows a time profile of a total output current of the converter circuit according to an exemplary embodiment of the present disclosure.

The total output current $i_{ug}$ accordingly results as $$i_{ug}(t) = I_0 \quad [7],$$

where $I_0$ is the pure DC component. For illustrative purposes, a time profile of a total output current $i_{ug}$ of the converter circuit is illustrated in FIG. 3.

Figure 4:
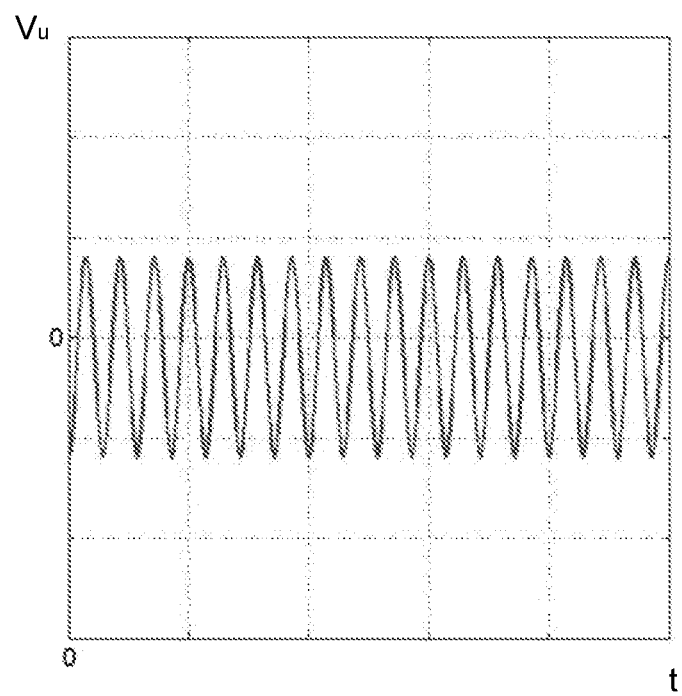
FIG. 4 shows a time profile of a voltage at the output connection of the converter circuit according to an exemplary embodiment of the present disclosure.
Figure 5:
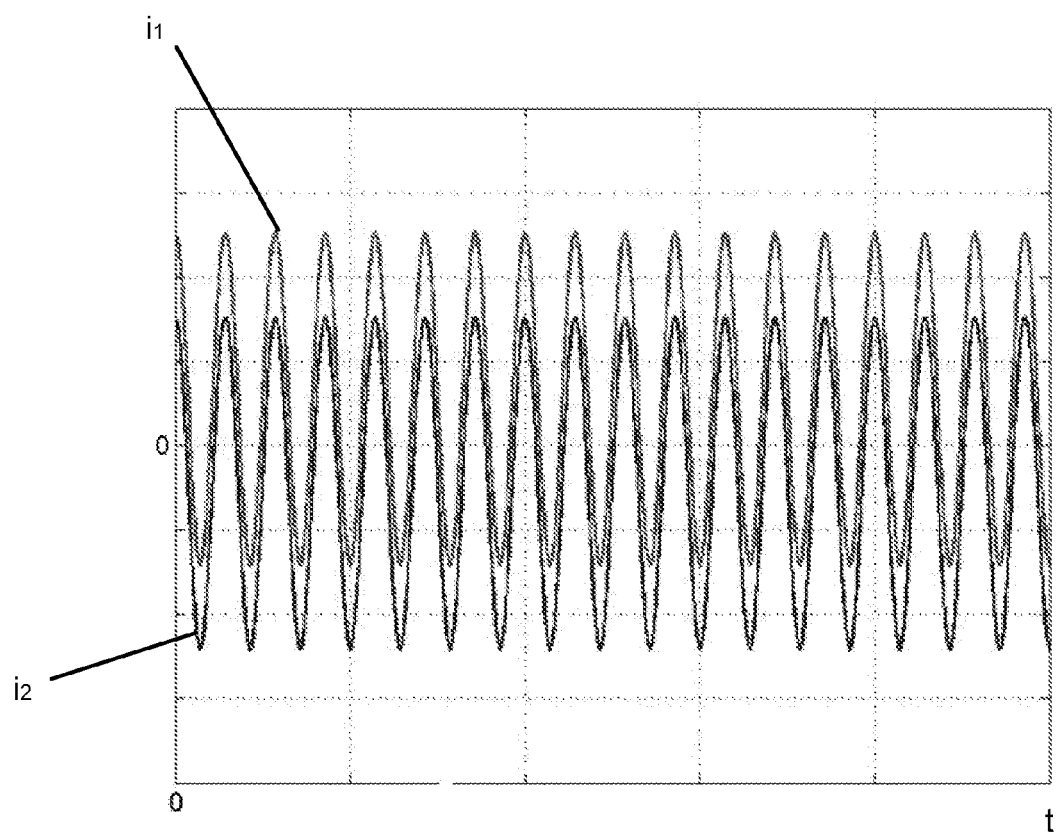
FIG. 5 shows a time profile of the current through the first subconverter system and the current through the second subconverter system according to an exemplary embodiment of the present disclosure.

Furthermore, FIG. 4 shows a time profile of a voltage $V_u$ at the output connection A of the converter circuit. Finally, FIG. 5 shows a time profile of the current $i_1$ through the first subconverter system 1 and the current $i_2$ through the second subconverter system 2, wherein likewise a DC component and an AC component with a frequency $\omega$, originating from the above-mentioned impressed oscillations, is contained in the two currents $i_1$, $i_2$. For reasons of completeness, mention is made of the fact that the currents in the capacitive energy stores do not have a DC component and likewise have AC components with the frequency $\omega$, but also double the frequency $\omega$ of the abovementioned impressed oscillations.

If the current $i_u$ at the output connection A is intended to have a desired AC component $\hat{i}_u \cdot \cos(\omega_u t + \phi_u)$ of the frequency $\omega_u$ and a desired phase shift $\phi_u$, formula [5.1] changes as follows:

$$\frac{1}{23}\hat{i}_u \cdot \cos(\omega_u t + \varphi_u) \cdot M_h^2 + A_h \cdot M_h \cos(\Delta\varphi) - \quad [8]$$
$$(1 + V_{ref}) \cdot (1 - V_{ref}) \cdot \hat{i}_u \cdot \cos(\omega_u t + \varphi_u) \equiv 0,$$

wherein, in order to determine the current signal amplitude value $A_h$, it is then possible to refer back to formula [5.2], and the current signal amplitude value $A_h$ and the voltage signal amplitude value $M_h$ can be determined, as already described above, from formula [8] and formula [5.2]. The current $i_u$ at the output connection A then results in a desirable manner as $$i_u(t) = \hat{i}_u \cdot \cos(\omega_u t + \phi_u) \quad [9].$$

The exemplary apparatus according to the present disclosure shown in FIG. 2 includes a first drive circuit 4 configured to produce the first drive signal S1, for each phase module 11. The first drive circuit 4 is connected to the power semiconductor switches of the switching cells 3 of the first subconverter system 1. In addition, the exemplary apparatus according to the present disclosure includes a second drive circuit 5 configured to produce the second drive signal S2, for each phase module 11. The second drive circuit 5 is connected to the power semiconductor switches of the switching cells 3 of the second subconverter system 2. According to an exemplary embodiment of the present disclosure, the sum of the voltage signal $V_L$ across the inductances L1, L2 and the switching function $\alpha_1$ for the power semiconductor switches of the switching cells 3 of the first subconverter system 1 is supplied to the first drive circuit 4 for forming the first drive signal S1, with respect to each phase module 11. With respect to each phase module 11, the sum of the voltage signal $V_L$ across the inductances L1, L2 and the switching function $\alpha_2$ for the power semiconductor switches of the switching cells 3 of the second subconverter system 2 is supplied to the second drive circuit 5 for forming the second drive signal S2. In order to form the first drive signal S1 and the second drive signal S2, a look-up table is used, for example, in each case in the first and second drive circuit 4, 5, in which the corresponding first drive signals S1 are assigned fixedly to the switching function $\alpha_1$ and in which corresponding second drive signals S2 are assigned fixedly to the switching function $\alpha_2$, or in each case a modulator is used for this purpose, for example, the modulator being based on a pulse width modulation method. Furthermore, with respect to each phase module 11, the exemplary apparatus includes a first computation unit 6 for forming the switching functions $\alpha_1$, $\alpha_2$ by means of calculating, in accordance with formulae [1] and [2] from the voltage signal $V_A$ with respect to the voltage $V_u$ at the output connection A and a selectable reference signal $V_{ref}$. The voltage signals $V_A$ with respect to the voltage $V_u$ at the output connections A of the phase modules 11 can be selected to be in phase with one another.

As shown in FIG. 2, with respect to each phase module 11, the exemplary apparatus includes a second computation unit 10 for forming the voltage signal $V_L$ across the inductances L1, L2 from a current signal $V_i$ of the subconverter systems 1, 2. The second computation unit 10 implements the formation of the voltage signal $V_L$ across the inductances L1, L2 by calculation by means of the formula [3].

In addition, with respect to each phase module 11, the exemplary apparatus includes a third computation unit 7 for forming the current signal $V_i$ of the subconverter systems 1, 2 from a current signal amplitude value $A_h$. The third computation unit 7 implements the formulation of the current signal $V_i$ of the subconverter systems 1, 2 by means of calculation in accordance with the formula [4].

Furthermore, with respect to each phase module 11, the exemplary apparatus includes a fourth computation unit 9 for forming the current signal amplitude value $A_h$ from the actual current value $i_u$ at the output connection A and the reference signal $V_{ref}$. The fourth computation unit 9 implements the formation of the current signal amplitude value $A_h$ by calculation in accordance with the formulae [5.1] and [5.2] or in accordance with the formulae [8] and [5.2].

A fifth computation unit 8, which is provided with respect to each phase module 11, is used for forming the voltage signal $V_A$ with respect to the voltage $V_u$ at the output connection A from a voltage signal amplitude value $M_h$. The fifth computation unit 8 implements the formation of the voltage signal $V_A$ with respect to the voltage $V_u$ at the output connection A by calculation in accordance with the formula [6].

The abovementioned fourth computation unit 9 serves likewise to form the voltage signal amplitude value $M_h$ from the actual current value $i_u$ at the output connection A and the reference signal $V_{ref}$. The fourth computation unit 9 implements the formation of the voltage signal amplitude value $M_h$ by calculation in accordance with the formulae [5.1] and [5.2] or in accordance with the formulae [8] and [5.2].

Overall, it has been possible to demonstrate that the apparatus according to the disclosure, for example, the apparatus shown in FIG. 2, for implementing the method according to the disclosure for operating the converter circuit can be realized in a very simple and cost-effective manner since the circuitry complexity involved is extremely low and, in addition, only a small number of components are required for the construction. It is therefore possible to implement the method according to the disclosure in a particularly simple manner using this apparatus.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF REFERENCE SYMBOLS

1 First subconverter system
2 Second subconverter system
3 Switching cell
4 First drive circuit
5 Second drive circuit
6 First computation unit
7 Third computation unit
8 Fifth computation unit
9 Fourth computation unit
10 Second computation unit
11 Phase module

What is claimed is:
1. A method for operating a converter circuit,
wherein the converter circuit includes at least two phase modules, each phase module having a first subconverter system and a second subconverter system, the subconverter systems being connected in series with one another for each phase module, a node between the two subconverter systems forming an output connection, each subconverter system including an inductance and at least one two-pole switching cell, which is connected in series with the inductance, and each switching cell having two drivable bidirectional power semiconductor switches, which are connected in series with a controlled unidirectional current guidance direction and a capacitive energy store, which is connected in parallel with the power semiconductor switches connected in series, the power semiconductor switches of the switching cells of the first subconverter system being driven by means of a first drive signal, and the power semiconductor switches of the switching cells of the second subconverter system being driven by means of a second drive signal, the method comprising:

for each phase module, forming the first drive signal from a voltage signal across the inductances and a first switching function for the power semiconductor switches of the switching cells of the first subconverter system, and forming the second drive signal from the voltage signal across the inductances and a second switching function for the power semiconductor switches of the switching cells of the second subconverter system;

forming the switching functions by means of a voltage signal with respect to the voltage at an output connection of the corresponding phase module and a selectable reference signal, the voltage signals being selected so as to be in phase with the voltage at the output connections of the phase modules;

forming, for each phase module, the voltage signal across the inductances from a current signal of the subconverter systems;

forming, for each phase module, the current signal of the subconverter systems from a current signal amplitude value; and forming, for each phase module, the current signal amplitude value from an actual current value at the output connection and the reference signal according to the equation $$\frac{1}{2} I_0 \cdot M_h^2 + A_h \cdot M_h \cdot \cos(\Delta\varphi) - (1 + V_{ref}) \cdot (1 - V_{ref}) \cdot I_0 \equiv 0, \text{ with } A_h \equiv M_h,$$

wherein $A_h$ is the current signal amplitude value, $V_{ref}$ is the reference signal, $I_0$ is a DC component of the current at the output connection $M_h$ is a voltage signal amplitude value and $\Delta\varphi$ is the phase difference between the current signal of the subconverter systems and the voltage at the output connection.

2. The method as claimed in claim 1, comprising:
for each phase module, forming the voltage signal with respect to the voltage at the output connection a voltage signal amplitude value.

3. The method as claimed in claim 2, comprising:
for each phase module, forming the voltage signal amplitude value from the actual current value at the output connection and the reference signal.

4. The method as claimed in claim 1, wherein, for each phase module, the current signal of the subconverter systems, the voltage signal across the inductances and the voltage signal with respect to the voltage at the output connection has the same frequency.

5. The method as claimed in claim 1, wherein, for each phase module, the voltage signal across the inductances and the voltage signal with respect to the voltage at the output connection has the same phase shift.

6. The method as claimed in claim 1, wherein, for each phase module, a reference voltage signal with respect to the voltage at the output connection is selected as the reference signal.

7. An apparatus for operating a converter circuit,
wherein the converter circuit includes at least two phase modules, each phase module including a first subconverter system and a second subconverter system, the subconverter systems being connected in series with one another for each phase module, a node between the two subconverter systems forming an output connection, each subconverter system including an inductance and at least one two-pole switching cell, which is connected in series with the inductance, and each switching cell having two drivable bidirectional power semiconductor switches, which are connected in series, with a controlled unidirectional current guidance direction and a capacitive energy store, which is connected in parallel with the power semiconductor switches connected in series, and
wherein the apparatus comprises:
a first drive circuit connected to the power semiconductor switches of the switching cells of the first subconverter system, the first drive circuit being configured to, for each phase module, produce a first drive signal by being supplied with, with respect to each phase module, a sum of a voltage signal across the inductances and a switching function for the power semiconductor switches of the switching cells of the first subconverter system;
a second drive circuit connected to the power semiconductor switches of the second subconverter system, the second drive circuit being configured to, for each phase module, produce a second drive signal by being supplied with, with respect to each phase module, the sum of the voltage signal across the inductances and a switching function for the power semiconductor switches of the switching cells of the second subconverter system;
a first computation unit configured to, with respect to each phase module, form the switching functions from a voltage signal with respect to the voltage at the output connection and a selectable reference signal, the voltage signals with respect to the voltage at the output connections of the corresponding phase modules being selected to be in phase;
a second computation unit configured to, with respect to each phase module, form the voltage signal across the inductances from a current signal of the subconverter systems;

a third computation unit configured to, with respect to each phase module, form the current signal of the subconverter systems from a current signal amplitude value; and
a fourth computation unit configured to, with respect to each phase module, form the current signal amplitude value from an actual current value at the output connection and the reference signal according to the equation $$\frac{1}{2} I_0 \cdot M_h^2 + A_h \cdot M_h \cdot \cos(\Delta\varphi) - (1 + V_{ref}) \cdot (1 - V_{ref}) \cdot I_0 \equiv 0, \text{ with } A_h \equiv M_h,$$

wherein $A_h$ is the current signal amplitude value, $V_{ref}$ is the reference signal, $I_0$ is a DC component of the current at the output connection, $M_h$ is a voltage signal amplitude value and $\Delta\phi$ is the phase difference between the current signal of the subconverter systems and the voltage at the output connection.

8. The apparatus as claimed in claim 7, comprising:
with respect to each phase module, a fifth computation unit configured to form the voltage signal with respect to the voltage at the output connection from a voltage signal amplitude value.

9. The apparatus as claimed in claim 8, wherein, with respect to each phase module, the fourth computation unit is configured to form the voltage signal amplitude value from the actual current value at the output connection and the reference signal.

10. The method as claimed in claim 4, wherein, for each phase module, the voltage signal across the inductances and the voltage signal with respect to the voltage at the output connection has the same phase shift.

11. The method as claimed in claim 10, wherein, for each phase module, a reference voltage signal with respect to the voltage at the output connection is selected as the reference signal.

12. The method as claimed in claim 2, wherein, for each phase module, a reference voltage signal with respect to the voltage at the output connection is selected as the reference signal.

13. The method as claimed in claim 3, wherein, for each phase module, a reference voltage signal with respect to the voltage at the output connection is selected as the reference signal.

14. The method as claimed in claim 4, wherein, for each phase module, a reference voltage signal with respect to the voltage at the output connection is selected as the reference signal.

15. The apparatus as claimed in claim 7, wherein, for each phase module, the current signal of the subconverter systems, the voltage signal across the inductances and the voltage signal with respect to the voltage at the output connection has the same frequency.

16. The apparatus as claimed in claim 7, wherein, for each phase module, the voltage signal across the inductances and the voltage signal with respect to the voltage at the output connection has the same phase shift.

17. The apparatus as claimed in claim 16, wherein, for each phase module, a reference voltage signal with respect to the voltage at the output connection is selected as the reference signal.

18. The apparatus as claimed in claim 7, wherein, for each phase module, a reference voltage signal with respect to the voltage at the output connection is selected as the reference signal.

19. The apparatus as claimed in claim 8, wherein, for each phase module, a reference voltage signal with respect to the voltage at the output connection is selected as the reference signal.

20. The apparatus as claimed in claim 9, wherein, for each phase module, a reference voltage signal with respect to the voltage at the output connection is selected as the reference signal.

* * * * *

UNITED STATES PATENT AND TRADEMARK OFFICE
CERTIFICATE OF CORRECTION

PATENT NO. : 8,717,787 B2
APPLICATION NO. : 13/447059
DATED : May 6, 2014
INVENTOR(S) : Manfred Winkelnkemper et al.

Page 1 of 1

It is certified that error appears in the above-identified patent and that said Letters Patent is hereby corrected as shown below:

In the Claims

Claim 1, Column 12, Line 63: change "com onent" to -- component --

Signed and Sealed this
Twenty-third Day of September, 2014

Michelle K. Lee
*Deputy Director of the United States Patent and Trademark Office*